United States Patent [19]

Jeon

[11] Patent Number: 5,951,684
[45] Date of Patent: Sep. 14, 1999

[54] METHOD OF BOOTING A COMPUTER SYSTEM WITH IDENTIFYING A CD-ROM DISK DRIVE OF THE SYSTEM AND A METHOD OF LOADING A DEVICE DRIVER

[75] Inventor: Young-Il Jeon, Suwon, Rep. of Korea

[73] Assignee: SamSung Electronics Co., Ltd., Kyungki-do, Rep. of Korea

[21] Appl. No.: 08/997,618

[22] Filed: Dec. 23, 1997

[51] Int. Cl.[6] .................................................. G06F 9/445
[52] U.S. Cl. ................................ 713/1; 713/2; 713/100; 709/301
[58] Field of Search ................................ 395/651, 652, 395/866, 700, 888, 681, 712; 713/1, 2, 100; 709/301; 710/46, 68

[56] References Cited

U.S. PATENT DOCUMENTS

| 5,325,532 | 6/1994  | Crosswy et al. | 395/700 |
| 5,598,563 | 1/1997  | Spies          | 395/652 |
| 5,668,992 | 9/1997  | Hammer et al.  | 395/651 |
| 5,694,600 | 12/1997 | Khenson et al. | 395/652 |
| 5,708,848 | 1/1998  | Sangveraphunsiri et al. | 395/842 |
| 5,710,941 | 1/1998  | Parry et al.   | 395/834 |
| 5,732,266 | 3/1998  | Moore et al.   | 395/651 |
| 5,758,189 | 5/1998  | Nakada et al.  | 395/866 |
| 5,794,032 | 8/1998  | Leyda          | 395/652 |
| 5,799,187 | 8/1998  | McBrearty      | 395/652 |
| 5,805,139 | 9/1998  | Uehara         | 345/156 |
| 5,819,115 | 10/1998 | Hoese et al.   | 395/888 |
| 5,822,582 | 10/1998 | Doragh et al.  | 395/652 |
| 5,867,714 | 2/1999  | Todd et al.    | 395/712 |

*Primary Examiner*—Joseph E. Palys
*Assistant Examiner*—Rijue Mai
*Attorney, Agent, or Firm*—Robert E. Bushnell, Esq.

[57] ABSTRACT

A method of booting a computer system with identifying the type of a CD-ROM disk drive of the computer system, the method comprising the steps of: producing an ATAPI IDENTIFY DRIVE command and outputting the ATAPI IDENTIFY DRIVE command to an IDE controller; reading information memorized in a memory of the CD-ROM disk drive in response to the ATAPI IDENTIFY DRIVE command; comparing the information with a predetermined set of internal CD-ROM disk drive information, and determining the type of the CD-ROM disk drive; and selecting a device driver according to the type of the CD-ROM disk drive, and loading the device driver on a memory.

15 Claims, 4 Drawing Sheets

METHOD OF BOOTING A COMPUTER SYSTEM WITH IDENTIFYING A CD-ROM DISK DRIVE OF THE SYSTEM AND A METHOD OF LOADING A DEVICE DRIVER

CLAIM OF PRIORITY

This application makes reference to, incorporates the same herein, and claims all benefits accruing under 35 U.S.C §119 from two applications filed in the Korean Industrial Property Office on Dec. 23, 1996, and there duly assigned Serial Numbers 96-70213 and 96-70214 by that Office.

BACKGROUND OF THE INVENTION

1. Field of the Invention

The present invention relates to a method of booting a computer system while identifying the type of CD-ROM (compact disk read only memory) disk drive that is connected to the computer system and a method of loading a device driver and, more particularly, to a method of booting a computer system by loading a device driver program which is suitable for the CD-ROM disk drive after identifying the type of CD-ROM disk drive that is connected to the computer system, and a method of loading the device driver program to a memory of the computer system after booting the computer system.

2. Description of the Related Art

In general, it is difficult for a computer system manufacturer to use one type of the peripheral device for manufacturing the computer system since the supply of the peripheral devices is unstable. Especially, the demand of the CD-ROM disk drive is greatly increased due to the development of the multimedia computer system, thus various types of the CD-ROM disk drives are used for the computer system. However, the programs for driving the CD-ROM disk drives, which are generally called as "device driver", are different from each other according to the types of the CD-ROM disk drives. Therefore, the computer system manufacturer or a user has to choose and use the device driver which is suitable for the CD-ROM disk drive of the computer system. Furthermore, since most application programs, such as Window 95 and Microsoft Word, and the device driver programs are provided to the consumer as recorded in a CD-ROM disk, the various types of the CD-ROM disk having various device drivers should be produced by the computer system manufacturer according to the type of CD-ROM disk drive. In addition, when a hard disk of the computer system is damaged and a user want to repair the hard disk driver with a CD-ROM disk, a device driver which is suitable for the existing CD-ROM disk drive should be chosen and be loaded in the memory of the computer. After that, the damaged hard disk can be repaired by using the CD-ROM disk. However, the consumers can not easily identify the type of the existing CD-ROM disk drive of his/her computer system, and can not easily choose or find a suitable device driver for the existing CD-ROM disk drive. This makes the repairing of the damaged hard disk difficult.

In addition, the programs for driving the peripheral devices, such as a CD-ROM disk drive, are generally called a "device driver", and their names have extension of "SYS". The file having the extension of "SYS" can not be executed by entering its name at DOS prompt, but the file can be executed by the computer system's operating system when booting the computer system if the file name is defined in the CONFIG.SYS file. The definition of the device driver in the CONFIG.SYS file is performed by writing its name with in a sentence starting with the command "DEVICE=" in the CONFIG.SYS file. For example, if the device driver for CD-ROM disk drive is CDROMDRV.SYS and has an option command of /D:MSCD001, and the file is in the directory of C:\DRIVE, the following sentence is required to execute the device driver.

DEVICE=C:\DRIVE\CDROMDRV.SYS/D:MSCD001

If the above command sentence exists in the CONFIG.SYS file, the computer system loads the device driver to its RAM (Random Access Memory) when booting, and then the CD-ROM disk drive can be operated properly. However, even though the computer system detects the type of peripheral device and knows the suitable device driver for the peripheral device, it is impossible to load the device driver on the RAM when the computer system is already booted. This is due to DOS's inherent limitation, which cannot be easily reformed. The limitation is explained as follows. Generally, when a program detects a peripheral device (a hardware), it has to use a result code to send the detected information to DOS, and a number (integers of 0 to 255) of the result code is sent to DOS as a parameter which is called as an "errorlevel". But the command sentence which can identify the "errorlevel", such as "if errorlevel x goto label_x" can not be included in CONFIG.SYS. Thus, it is impossible for the CONFIG.SYS file to detect a hardware, and generate the result code for the hardware, and load the device driver for the hardware on the RAM with using the "if" sentence. Since this is an inherent limitation of DOS, it can not be remedied without reforming the DOS operating system program. Due to this limitation, to load a new device driver on a computer system which is already booted, a user has to correct the CONFIG.SYS file and reboot the computer system.

The following patents, incorporated herein by reference, describe various method for configuring a computer system and/or device drivers for use therein: U.S. Pat. No. 5,325, 532 to Wm. Caldwell Crosswy, et al. entitled *Automatic Developement Of Operating System Boot Image* which detects whether the hardware configuration has changed and develops a new boot image upon detection of the new hardware configuration; U.S. Pat. No. 5,598,563 to Terence R. Spies entitled *Method Of Loading Device Drivers From ROM Without Requirement Of System To Have Any Harddisks Or Floopy Drives And Without Using Config.sys File* contemplates a method for sequentially storing device drivers including associated headers in an adapter region of a computer's address space. Each header includes information for loading and initializing its associated device driver and information for identifying the address of the header for loading the next following device driver; and U.S. Pat. No. 5,668,992 to Jack L. Hammer, et al., entitled *Self-Configuring Computer Systems* which scans a systems components and loads appropriate software to support the configuration.

SUMMARY OF THE INVENTION

It is an object of the present invention to provide a method of booting a computer system and automatically identifying the type of CD-ROM disk drive connected the computer system and loading a device drive of the identified CD-ROM disk drive on a RAM of the computer system.

It is another object of the present invention to provide a method of loading a new device driver program on a RAM of the computer system after booting the computer system.

It is a yet another object of the present invention to save the cost for manufacturing many disks, each of them having a device driver for one piece of hardware.

It is a further object of the present invention to provide a hard disk repairing system which detects the hardware of the computer system and loads proper device drivers according to the detected hardware.

To achieve the above object, a method of booting a computer system of the present invention comprises producing an ATAPI IDENTIFY DRIVE command and outputting the ATAPI IDENTIFY DRIVE command to an IDE controller, reading information memorized in a memory of the CD-ROM disk drive in response to the ATAPI IDENTIFY DRIVE command, comparing the information with a predetermined set of internal CD-ROM disk drive information to determine the type of CD-ROM disk drive, selecting a device driver according to the type of CD-ROM disk drive, and loading the device driver on a memory.

The present invention also provides a method of loading a device driver, and the method comprises the steps of: rearranging a position of a program loaded in a memory so as to produce an area for a new device driver to be loaded in the memory between an area of the program and an area of a last device driver which is already loaded in the memory; reading the new device driver from a memory device; detecting an address of the last device driver which is already loaded in the memory; preparing a command packet for controlling the new device driver; initializing the new device driver by calling a strategy routine and an interrupt routine of the new device driver; exchanging the address of the last device driver with the address of the new device driver; and memorizing the new device driver on the memory.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will become apparent from a study of the following detailed description with reference to the accompanying drawings.

The method of booting a computer system and identifying the type of an existing CD-ROM disk drive according to the first embodiment of this invention can be applied to a computer system having a hard disk and the CD-ROM disk drive. A port on which the CD-ROM disk drive is mounted can be identified by referencing the CMOS setup information when booting. Generally, the hard disk is mounted on a primary master and the CD-ROM disk drive is mounted on a secondary master. The method of booting a computer system according to the first embodiment can be advantageously used in a hard disk repairing program, since the hard disk repairing program has to boot the computer system by itself and operate the CD-ROM disk drive of the computer system. Preferably, the hard disk repairing program is included in an AUTOEXEC.BAT file recorded in a booting disk, and operated when booting the computer system with the booting disk.

Figure 1:
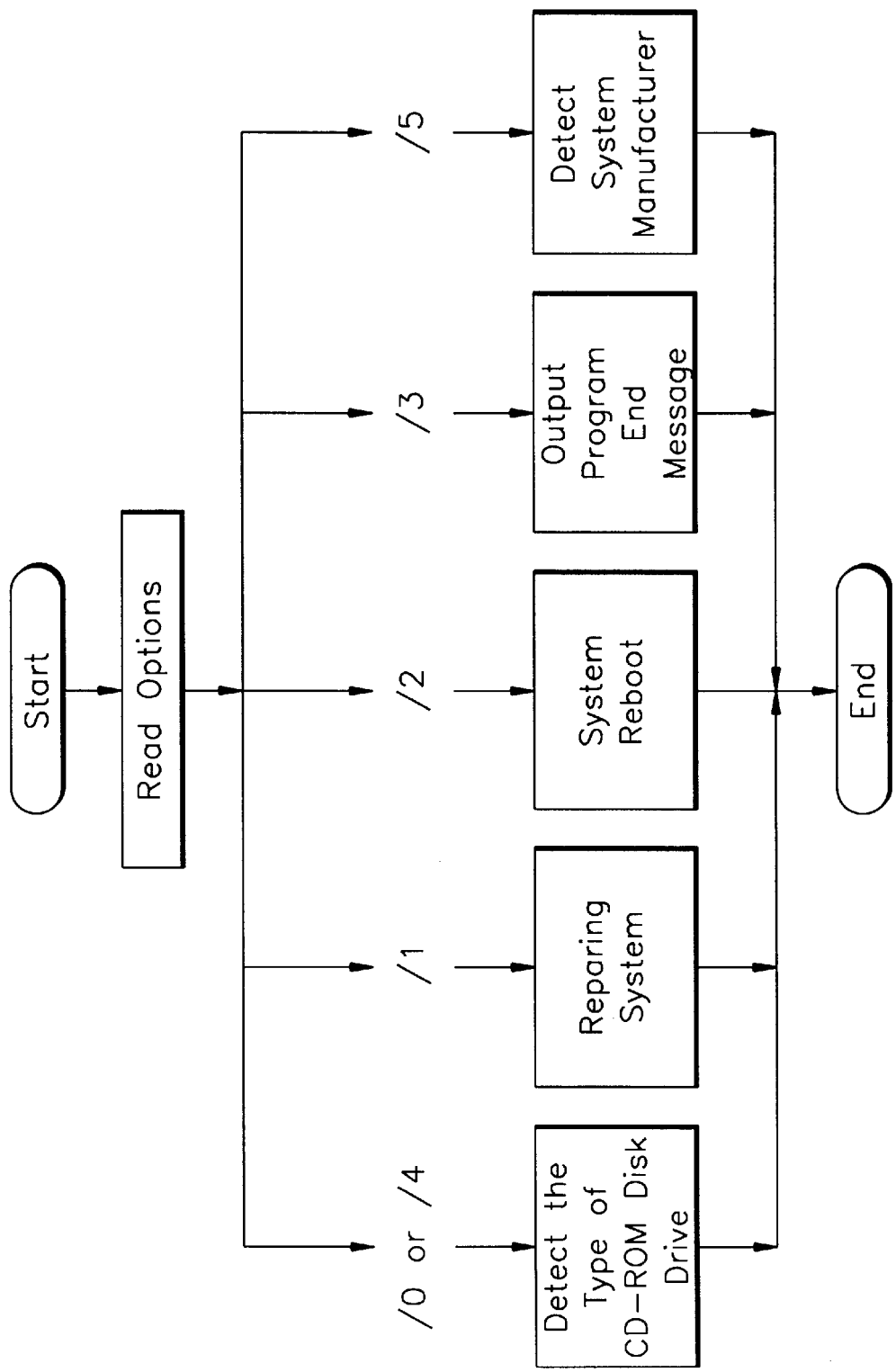
FIG. 1 is a flow chart illustrating the operations a harddisk repairing program according to the first embodiment of this invention.
Figure 2:
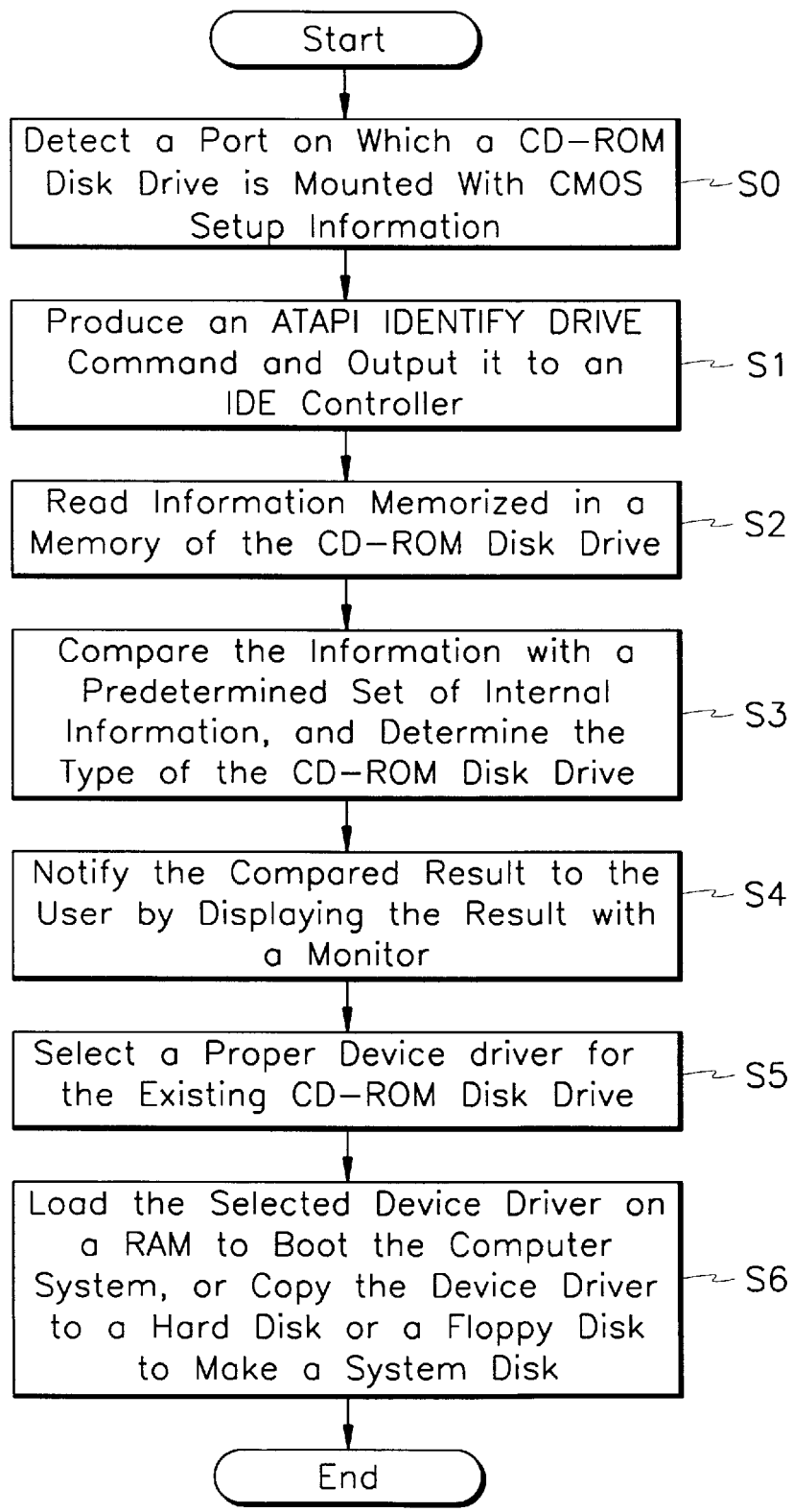
FIG. 2 is a flow chart illustrating the method of booting a computer system while identifying the type of CD-ROM disk drive connected to the computer system according to the first embodiment of this invention.

As shown in FIG. 1, the hard disk repairing program detects the type of a CD-ROM disk drive when a user choose options /0 or /4. The difference of the two options is that the option /0 returns a message regarding detected result, but the option /4 does not. As shown in FIG. 2, to detect the type of the CD-ROM disk drive, the computer system detects a port on which the CD-ROM disk drive is mounted with the CMOS setup information when booting (S0). Then the repairing program produces an ATAPI (AT Attachment Packet Interface) IDENTIFY DRIVE and outputs it to an IDE controller which controls the CD-ROM disk drive (S1). ATAPI is an interface command between the computer and attached CD-ROM drives and tape backup drives. Most computers use a standard IDE (Integrated Drive Electronics) interface to address hard disk drives. ATAPI provides the additional commands needed for controlling a CD-ROM player so that the computer can use the IDE interface and controllers to control the CD-ROM devices. ATAPI is part of the Enhance IDE (EIDE) interface (also known as ATA-2). IDE is a standard electronic interface used between a computer motherboard's data paths or bus and the computers disk storage devices. The IDE system means a system which controls disk drives or CD-ROM disk drives without using a separate hardware to control the drives in the computer system. This is performed by mounting a memory chip for memorizing a disk drive control program on a printed circuit board of each disk drive. Then the computer system controls the program on the memory chip to control the disk drive. With the IDE system, the computer system can control disk drives with only a general controller. And, the ATAPI represents a standard of interface for the IDE CD-ROM disk drive. Thus, among the standard commands of ATAPI, when the ATAPI IDENTIFY DRIVE command (0A1H) is input to the IDE controller, the IDE controller reads 512 bytes of information memorized in a memory chip of the CD-ROM disk drive, and outputs the results (S2). Among the 512 bytes of information, the information regarding the CD-ROM disk drive manufacturer is recorded between 54 bytes and 64 bytes. Thus, the repairing program compares the information with its internal information, and determines the type of CD-ROM disk drive (S3). The determination is performed because the repairing program has an information list regarding the CD-ROM disk drive models, file names of the device driver for each CD-ROM disk drive model and CD-ROM disk drive manufacturer. This information list can be memorized in a separate file for fisher use. Thus, if there is no information regarding the existing CD-ROM disk drive in the information list, a user has to input the information into the repairing program for proper operation of the repairing program.

Next, step S4 is an optional step of providing the information to the user by displaying the information on a monitor. Upon determining the type of CD-ROM disk drive, the repairing program selects the proper device driver for the existing CD-ROM disk drive (S5). The selected device driver is loaded on the RAM to boot the computer system, or copied to a hard disk or a floppy disk to make a system disk (S6).

In FIG. 1, if the user selects the option /5, the repairing program detects the information regarding the computer system manufacturer which is recorded in fixed address of the ROM BIOS of the computer system. This option is to execute the repairing program in a specific type of the computer system. The option /1 is to repair the damaged hard disk by deleting all programs in the damaged hard disk and reinstalling the original programs and making a system disk. The option /2 is to output a message for system-reboot after repairing the damaged hard disk, and the option /3 is to output the repairing-program-end-message. These options can be properly arranged by the user or the system manufacturer for various applications of the detected result of the CD-ROM disk drive. Namely, while executing the repairing program with the option /0 or /4 when booting the computer system, the computer system can be booted regardless of the type of CD-ROM disk drive and the proper device driver for the CD-ROM disk drive can be loaded on the RAM of the computer system. Furthermore, the system disk can be prepared by using the device driver.

As another example, with proper arranging of the options /1, /0 and /4, the files recorded in the damaged hard disk can be deleted, and the type of existing CD-ROM disk drive is detected and the proper device driver for the existing CD-ROM disk drive can be loaded on the RAM of the computer system.

Hereinafter, as the second embodiment of this invention, the method of loading the device driver on the RAM of the computer system under the condition that the computer system is already booted will be described. For the convenience of explanation, the program for loading the device driver on the RAM is called as "launcher" in this specification. The launcher is executed by entering the following command at DOS prompt.

A>launcher d:\path\filemane.sys/option

Figure 3:
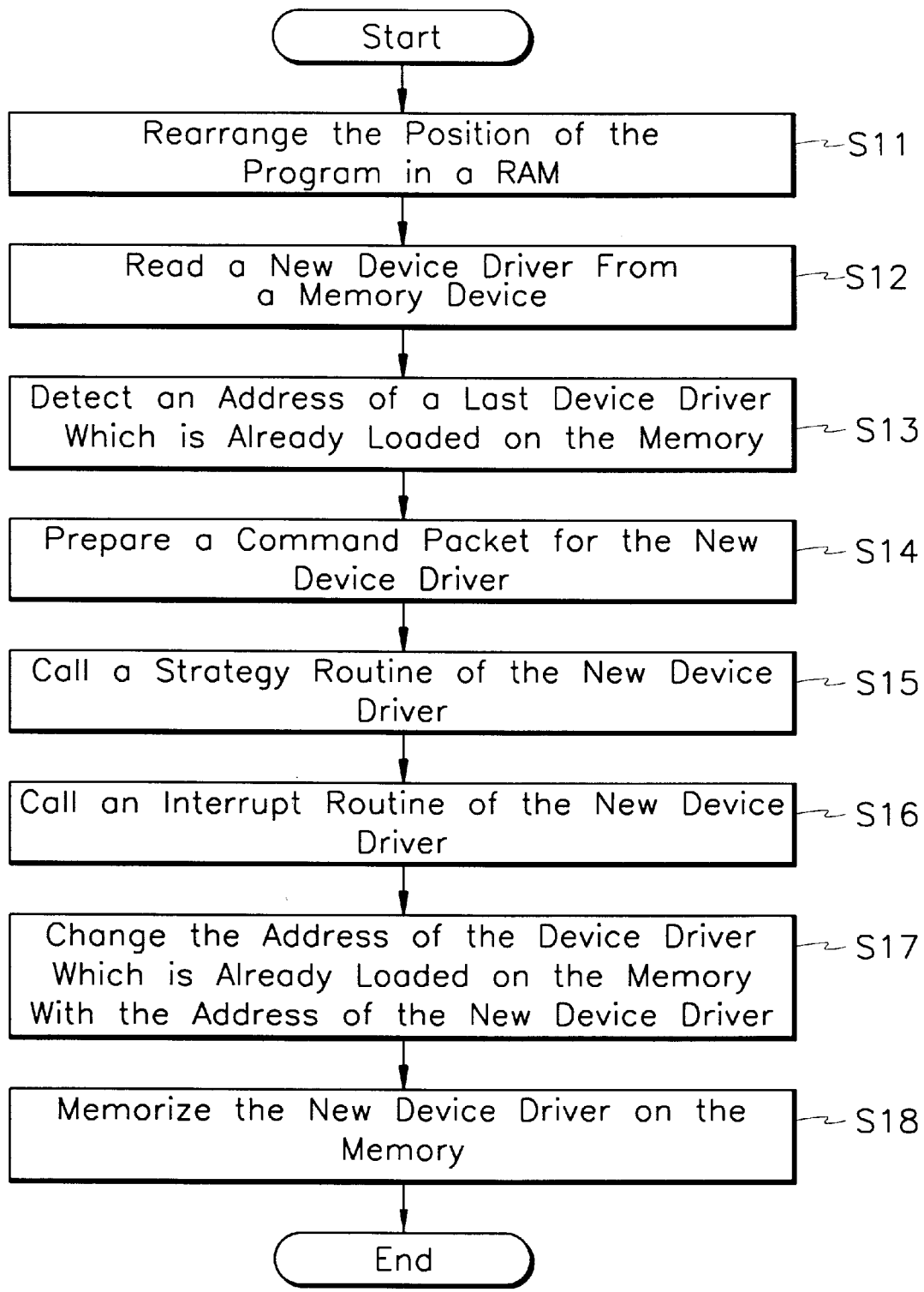
FIG. 3 is a flow chart illustrating the method of loading a device driver according to the second embodiment of this invention.
Figure 4:
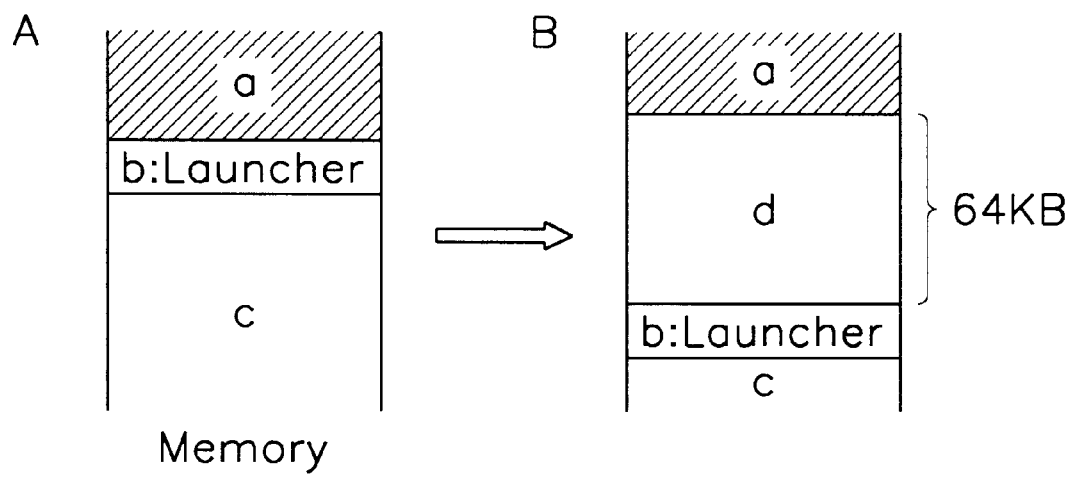
FIG. 4 is a schematic diagram showing the change of the memory structures for loading the device driver on the memory according to the second embodiment of this invention.

In the command, d:\path represents the path at which the filename.sys file is recorded, and filename.sys is a filename of a device driver to be loaded on the RAM. As shown in FIG. 3, upon entering the command, the launcher program is loaded on the memory (RAM), and the position of the program in the RAM is rearranged (S11). As shown in FIG. 4A, upon entering the command, the launcher program is positioned at the position next to the already loaded programs. In FIG. 4, the reference character "a" represents the area of the device drivers loaded on the RAM when booting the computer system, the reference character "b" represents the area of the launcher program loaded on the RAM, and the reference character "c" represents the empty area of the RAM. As shown in FIG. 4B, the loaded launcher program moves its position to clear 64 KB of memory. This process is performed by copying the launcher program at the position of 64 KB after the position of the already loaded device drivers, and by adding 64 KB to the code segment of the launcher program. The 64 KB is an area for loading a new device driver, and marked as "d" in FIG. 4B. Since the size of general device driver is less than the 64 KB, the 64 KB is enough area for the general device driver. Then the launcher program reads the new device driver, namely, filename.sys which is defined at the above-command (S12), then finds an address of a last device driver which is already loaded on the area "a" of the memory when booting (S13). The filename.sys is memorized in and read from a memory device such as a hard disk driver or a floppy disk driver. Then the launcher program makes a command packet to initialize a strategy routine and an interrupt routine of the new device driver. DOS inherently includes the command packets to initialize device drivers and to generate interrupts for the device drivers, and the device drivers which are loaded on the memory when booting the computer system can utilize the command packets of the DOS. However, when a device driver is loaded on the memory after booting the computer system, the device driver can not utilize the command packet of the DOS. Thus, to properly execute the new device driver on the area "d", a separate command packet should be memorized on the memory with the device driver, and the separate commandpacket should be prepared to coincide with the file attribution of the device driver (S14). An example of the structure of the command packet to initialize the device driver is as follows.

+0: Size of the Packet (Byte): designate 24

+1: Name of Unit: designate 0

+2: Command Code: 0 value represents an initialization command.

+3: Status Flag: 8000H represents an error, and 0000H represent a normal state.

+5: 8 bytes which are not used: designate 0 for the 8 bytes

+13: Number of unit: designate 0

+14: Address to be referred in case of break (Segment: Offset)

+18: First Address for an Input parameter (Segment: Offset), designate the first address of the memory at which the option parameter is inputted.

+22: Driver number of next driver: designate 0

+23: Designate 0 for making the number of bytes to be even number

After making the command packet, the launcher program calls a 6th address of the device driver at which the address of the strategy routine is recorded so that the device driver can detect the first address of the command packet (S15). Then the launcher program calls an 8th address of the device driver at which the address of the interrupt routine is recorded (S16). Upon calling this routine, the size of the device driver is returned to an AX register. By the above process, the launcher program initializes the last device driver. The next step is to change the address of the device driver which is already loaded on the memory so that the computer system can detect the new device driver (S17).

The process of changing the address of the last device driver is as follows. Generally, the first 0 to 4 bytes of a device driver's files includes an address value of the next device driver. Thus, DOS detects the first device driver by referencing the first 0 to 4 bytes of the first device driver, then DOS detects the second device driver by referencing the first 0 to 4 bytes of the second device driver. And the first 0 to 4 bytes of the last device driver which is loaded on the memory by CONFIG.SYS file include the value of 0FFFFH, 0FFFFH (4 bytes) to indicate that the current device driver is the last device driver. The launcher program writes the address of the new device driver on the first 0 to 4 bytes of the last device driver, and writes −1 on the first 0 to 4 bytes of the new device driver to represent that the new device driver is the new last device driver. Finally, the launcher program loads the new device driver on the area "d" of the memory and finishes its operation (S18).

With the method of loading device drivers according to the second embodiment of this invention, a CD-ROM disk drive driver, a hard disk drive driver, etc., can be loaded on the memory in addition to the device drivers which are loaded by CONFIG.SYS.

The launcher command can be executed by batch operation in the AUTOEXEC.BAT file, or can be executed at DOS prompt. And, if the computer system detects a type of hardware (drive) by a program according to the first embodiment of this invention (for convenience, the program is called "detectcd.exe" in this specification), the proper device driver can be loaded with the following procedure. In the following procedure, when the "detectcd" program detects company A's hardware in the computer system, the program returns the value "1", and when the "detectcd" program detects company B's hardware, the program returns the value "2", and A.sys and B.sys are the proper device drivers for the A and B company's hardwares, respectively.

Detectedcd.exe

If errorlevel 1 goto company_A

If errorlevel 2 goto company_B goto finish

:company_A launcher c:\A.sys/option goto finish

:company_B launcher c:\B.sys/option goto finish

:finish

With the above-described procedure, one can automatically load a proper device driver suitable for his/her hardware with one disk. Thus, it is not required to prepare a disk for each hardware, and to reboot the computer system to load a device driver.

According to this invention, the user can be informed of the type of the hardware in his/her computer system, and the proper device driver for the type of the hardware can be loaded with booting or after the booting procedure of the computer system. Therefore, with a disk having the program realizing the methods of this invention, the hardware of the computer system is automatically detected and the device driver is also automatically loaded on the memory of the computer system.

What is claimed is:

1. A method of booting a computer system with identifying the type of CD-ROM disk drive attached to the computer system, the method comprising the steps of:

producing an ATAPI IDENTIFY DRIVE command and outputting the ATAPI IDENTIFY DRIVE command to an IDE controller;

reading identification information memorized in a memory of the CD-ROM disk drive in response to the ATAPI IDENTIFY DRIVE command;

comparing the identification information with a predetermined set of CD-ROM disk drive information stored internally in said computer system, and determining the type of CD-ROM disk drive; and selecting a device driver according to the type of CD-ROM disk drive, and loading the selected device driver on a memory, said steps of selecting and loading further comprising the steps of:

rearranging a position of a program loaded in said memory so as to produce an area for a new device driver to be loaded in the memory between an area of the program and an area of a last device driver which is already loaded in the memory;

reading the selected device driver from a memory device;

detecting an address of the last device driver which is already loaded in the memory;

preparing a command packet for controlling the selected device driver;

initializing the selected device driver by calling a strategy routine and an interrupt routine of the selected device driver;

exchanging the address of the last device driver with an address of the selected device driver; and memorizing the selected device driver on the memory in said area produced by said rearranging step.

2. The method as set forth in claim 1, further comprising the step of detecting a port on which the CD-ROM disk drive is mounted with CMOS setup information.

3. The method as set forth in claim 2, further comprising a step of displaying information notifying a user of the type of the CD-ROM disk drive after determining the type of CD-ROM disk drive.

4. The method as set forth in claim 3, wherein the step of selecting the device driver as set forth in the type of the CD-ROM disk drive is performed by the user.

5. The method as set forth in claim 1, further comprising a step of notifying a user of the type of CD-ROM disk drive after determining the type of CD-ROM disk drive.

6. The method as set forth in claim 1, wherein the area for the selected device driver to be loaded in the memory has a size of 64 KB.

7. The method as set forth in claim 1, wherein the memory is a random access memory.

8. A method of loading a device driver, the method comprising the steps of:

rearranging a position of a program loaded in a memory so as to produce an area for a new device driver to be loaded in the memory between an area of the program and an area of a last device driver which is already loaded in the memory;

reading the new device driver from a memory device;

detecting an address of the last device driver which is already loaded in the memory;

preparing a command packet for controlling the new device driver;

initializing the new device driver by calling a strategy routine and an interrupt routine of the new device driver;

changing the address of the last device driver with to an address of the new device driver;

memorizing the new device driver on the memory in said area produced by said rearranging step; and designating said new device driver as the last device driver.

9. The method as set forth in claim 8, wherein the area produced by said rearranging step has the size of 64 KB.

10. The method as set forth in claim 8, wherein the new device driver is a CD-ROM disk drive driver.

11. The method as set forth in claim 8, wherein the memory device is a device selected from the group of a hard disk driver and a floppy disk driver.

12. The method as set forth in claim 8, wherein the memory is a random access memory.

13. A method of booting a computer system with identifying the type of CD-ROM disk drive attached to the computer system, the method comprising the steps of:

producing an ATAPI IDENTIFY DRIVE command and outputting the ATAPI IDENTIFY DRIVE command to an IDE controller;

reading identification information memorized in a memory of the CD-ROM disk drive in response to the ATAPI IDENTIFY DRIVE command;

comparing the identification information with a predetermined set of CD-ROM disk drive information stored internally in said computer system, and determining the type of CD-ROM disk drive;

notifying a user of the type of CD-ROM disk drive after determining the type of CD-ROM disk drive by displaying the type of CD-ROM disk drive on a monitor;

selecting a device driver according to the type of CD-ROM disk drive; and loading the selected device driver in a 64 KB area of a random access memory.

14. The method as set forth in claim 13, wherein the step of selecting the device driver is performed by the user.

15. The method as set forth in claim 13, further comprising the steps of:

rearranging a position of a program loaded in a memory so as to produce an area for a new device driver to be loaded in the memory between an area of the program and an area of a last device driver which is already loaded in the memory;

reading the new device driver from a memory device;

detecting an address of the last device driver which is already loaded in the memory;

preparing a command packet for controlling the new device driver;

initializing the new device driver by calling a strategy routine and an interrupt routine of the new device driver;

changing the address of the last device driver with to an address of the new device driver;

memorizing the new device driver on the memory in said area produced by said rearranging step; and designating said new device driver as the last device driver.

* * * * *